Jan. 23, 1934.     O. B. GOLDKAMP     1,944,425
BALANCED VALVE APPARATUS FOR FLUID REGULATORS
Filed Aug. 14, 1931
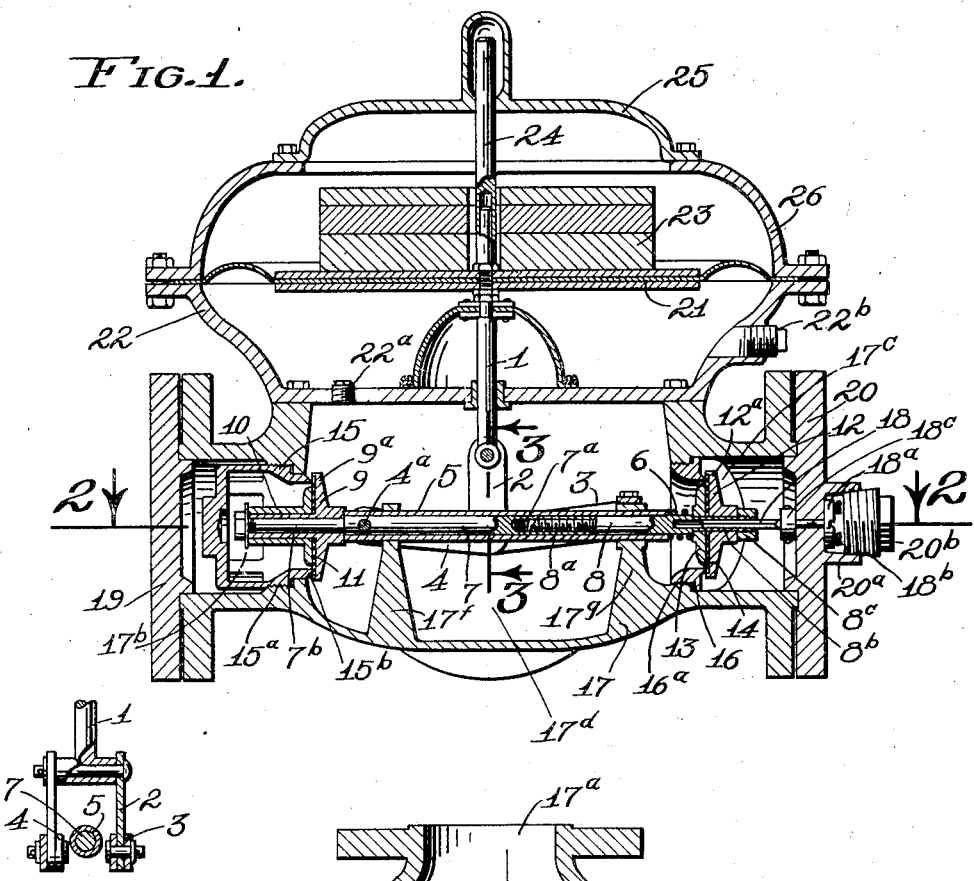
INVENTOR
OTTO B. GOLDKAMP
BY
A. B. Bowman
ATTORNEY Patented Jan. 23, 1934

1,944,425

UNITED STATES PATENT OFFICE 1,944,425

BALANCED VALVE APPARATUS FOR FLUID REGULATORS

Otto B. Goldkamp, San Diego, Calif., assignor of one-half to San Diego Consolidated Gas and Electric Company, San Diego, Calif., a corporation of California Application August 14, 1931. Serial No. 556,992

6 Claims. (Cl. 50—26)

My invention relates to valve apparatus for fluid regulators in which the valves are balanced by the pressure of the fluid and in which opposed valves are used, and the objects of my invention are:

First, to provide an apparatus of this class in which toggles are used in connection with balanced valves to facilitate their operation;

Second, to provide a new and novel balanced valve arrangement;

Third, to provide a novel arrangement of balanced valves with toggle controls for fluid regulators;

Fourth, to provide a novel means of adjusting balanced valves in a fluid regulator;

Fifth, to provide a novel toggle controlled balanced valve structure for fluid regulators;

Sixth, to provide a balanced valve apparatus of this class for fluid regulators which is very simple of construction, operation and installation, durable and efficient.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a sectional view of my novel valve apparatus shown in connection with one kind of a control means, the section taken through 1—1 of Fig. 2; Fig. 2 is a sectional view showing the valves and their control on the line 2—2 of Fig. 1; Fig. 3 is a fragmentary sectional view of the toggle connections with the control taken through 3—3 of Fig. 1 and Fig. 4 is a fragmentary sectional view through 4—4 of Fig. 2.

Similar characters of reference refer to similar parts and portions throughout the several views of the drawing.

The shaft 1, toggle members 2, 3 and 4, hollow shaft 5, spring 6, shaft members 7 and 8, valve members 9, 10 and 11, valve members 12, 13 and 14, valve cage 15, valve seat member 16, valve casing 17, and shaft 18 constitute the principal parts and portions of my balanced valve apparatus for fluid regulators.

The casing 17 is provided with an inlet portion 17a for receiving the fluid which passes through the valves through passages 17b and 17c, guided by the partition 17d. There is a single outlet passage 17e.

The casing is provided with casing caps 19 and 20 positioned for the ready removal of the valves.

Mounted in the lower side of the casing 17 are extended journal portions 17f and 17g, in which is journaled a shaft 5 and adapted to shift longitudinally therein. Secured in the shaft 5 is another shaft 7 which is provided at one end with a threaded hole 7a which is adapted to receive a threaded reduced portion 8a of a shaft 8 which is also shiftably mounted in the hollow shaft 5.

Mounted on the journal member 17g are a pair of toggle members 3 to the free ends of which are pivotally connected a pair of toggle members 4, the opposite ends of which are pivotally connected to the shafts 5 and 7 by means of a bolt 4a. Pivotally connected to the inner ends of the toggle members 3 and 4 are the toggle members 2 which extend upwardly and are pivotally connected with a journal portion of the shaft 1. This shaft 1 is guided in the casing, and with movement upwardly and downwardly by the control mechanism hereinafter described, the shafts 5 and 7 are shifted longitudinally by means of the toggle members.

The shaft 7 is provided with a reduced end portion 7b upon which is mounted the valve member 9 which is provided with an annular flange 9a against the face of which is supported a valve seating member 11, which is clamped against the face 9a by means of the member 10 which is held in position by means of a nut on the portion 7b of the shaft 7, thus clamping the member 11 in position between the members 9 and 10.

Mounted in the casing 17 by means of screw threads 15a is a valve cage 15 which is provided with a plurality of openings to admit the fluid therethrough. It is provided on its inner edge with a valve seating portion 15b which engages the member 11 near its periphery when the valve is in its enclosed position.

The shaft 8 is provided with a reduced portion 8b upon which is mounted the valve member 12 which is provided with a flange 12a against the face of which the valve seating member 14 rests. This valve seating portion 14 is supported by means of a flange member 13, the members 13, 14 and 12 being clamped together on the portion 8b by means of a nut 8c. Interposed between the flange member 13 and the end of the shaft 5 is a compression spring 6 which tends to separate the member 13 and the shaft 5 and provides taking up the slack in the threads on the portion 8a.

The end of the shaft 8 is provided with a square hole in which is shiftably mounted the square shaft 18. This shaft extends inwardly through the cap 20 and is provided on its outer end with a head 18a which is provided with set screws 18b to prevent the accidental turning of the head. This head 18a is revolubly mounted in a hollow boss 20a on the cap 20 and is held from longitudinally shifting by means of a collar 18c mounted on the shaft 18 and resting against the inner face of the cap 20. Mounted in the boss 20a is a plug member 20b which serves as an enclosure for the head 18a but permits access to this head 18a for turning the same for adjusting the relative position of the valve members so that they are always sure to engage the valve seats properly. It will be noted that this head 18a is provided with a slot for a screw driver or wrench to facilitate the turning of the same.

The valve seating portion 14 engages a valve seat 16 which is secured in the casing by means of screw threads 16a. The caps 19 and 20, it will be noted, are removable so that the valves at the opposite ends may be easily removed.

The shaft 1 may be operated by various means. In this case I have shown a diaphragm 21 to which the shaft 1 is connected, and pressure is admitted to the casing 22 through the orifice 22a or externally through the orifice 22b or both as desired. The diaphragm is provided with weights 23 on its upper end and the whole is guided by means of a shaft 24 which extends upwardly in a cap 25 on the upper portion of the casing 26; the periphery of the diaphragm 21 being supported between the casing members 22 and 26.

The operation of my balanced valve apparatus is as follows:

When the pressure is raised which causes the diaphragm 21 to move upwardly at its central portion, the shaft 1 is raised carrying with it the toggle members 2 which in turn operate the toggle members 3 and 4 and cause the shafts 5 and 7 to move longitudinally carrying the valve seating member 11 against the valve seating portion 15b closing the valve. This shifting also carries the shaft 8 with it which brings the valve seat member 14 in engagement with the valve seat member 16 closing the valve on the opposite side. Inasmuch as the pressure is equalized with the flow of fluid to the outer side of the valve member 12 and to the opposite side of the valve member 9, there is a balanced pressure on the two valves.

It will be noted that the spring 6 is for the purpose of taking up any wear or slack on the screw threads 8a of the shaft 8. The valves may be readily adjusted relative to their seats by seating the valve member 11 on its seat 15b, then removing the plug 20b, loosening the set screws 18b and turning the head 18a which in turn will turn the shaft 8 into the shaft 7 against the tension of the spring 6 so there will be no back lash or looseness.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a balanced valve apparatus for fluid regulators, a pair of valves connected to a common shaft, toggle means for operating said valves simultaneously and a casing for said valves with spaced conductors for conducting fluid to said valves in opposite directions, whereby the pressure on said valves is balanced, means for adjusting the relative position of said valves from the outside of said casing, and means for locking said valves in their adjusted relative positions.

2. In a balanced valve apparatus for fluid regulators, a pair of spaced valves both facing in the same direction, toggle means for shifting said valves into engagement with their seats and a casing provided with a pair of fluid conductors arranged to conduct fluid, tending to open one of said valves and tending to close the other valve, whereby the pressure on the two valves is balanced, means for adjusting the relative position of said valves from the outside of said casing, and means for locking said valves in their adjusted relative positions.

3. In an apparatus of the class described, a pair of spaced valves, a casing with conductors arranged for balancing the pressure to said valves, toggle means cooperatively connected with said valves for simultaneously operating said valves by leverage action, means in connection with said valves operable from the outside of said casing for adjusting the relative position of said valves, and means for locking said valves in their adjusted relative positions.

4. In a balanced valve apparatus for fluid regulators, a casing provided with a pair of opposed separate inlet conductors and a single outlet conductor, a pair of rigidly connected valves arranged in said casing to receive fluid pressure from one of said inlet conductors on one side of said valves, and to receive fluid pressure from the other inlet conductor on the other side of said valves, whereby pressure is balanced on said valves, a pair of shafts shiftably connecting said valves, the one adjustable longitudinally relative to the other, whereby said valves may be relatively adjusted, and means for locking said valves in their adjusted relative positions.

5. In a balanced valve apparatus for fluid regulators, a pair of valves connected to a common shaft, toggle means for operating said valves simultaneously, a casing for said valves provided with spaced conductors for conducting fluid to said valves in opposite directions, valve cages positioned in said conductors, means for adjusting the relative position of said valves from the outside of said casing, and means for locking said valves in their relative adjusted positions.

6. In a balanced valve apparatus for fluid regulators, a pair of spaced caged valves, a casing with conductors arranged for balancing the pressure to said caged valves, toggles operatively connected with said valves for simultaneously balancing said valves by leverage action, means in connection with said valves operable from the outside of said casing for adjusting the relative position of said valves, and means for locking said valves in their relative adjusted positions.

OTTO B. GOLDKAMP.